Aug. 20, 1940.  A. L. PARKER  2,212,183
TUBE COUPLING
Original Filed March 2, 1938
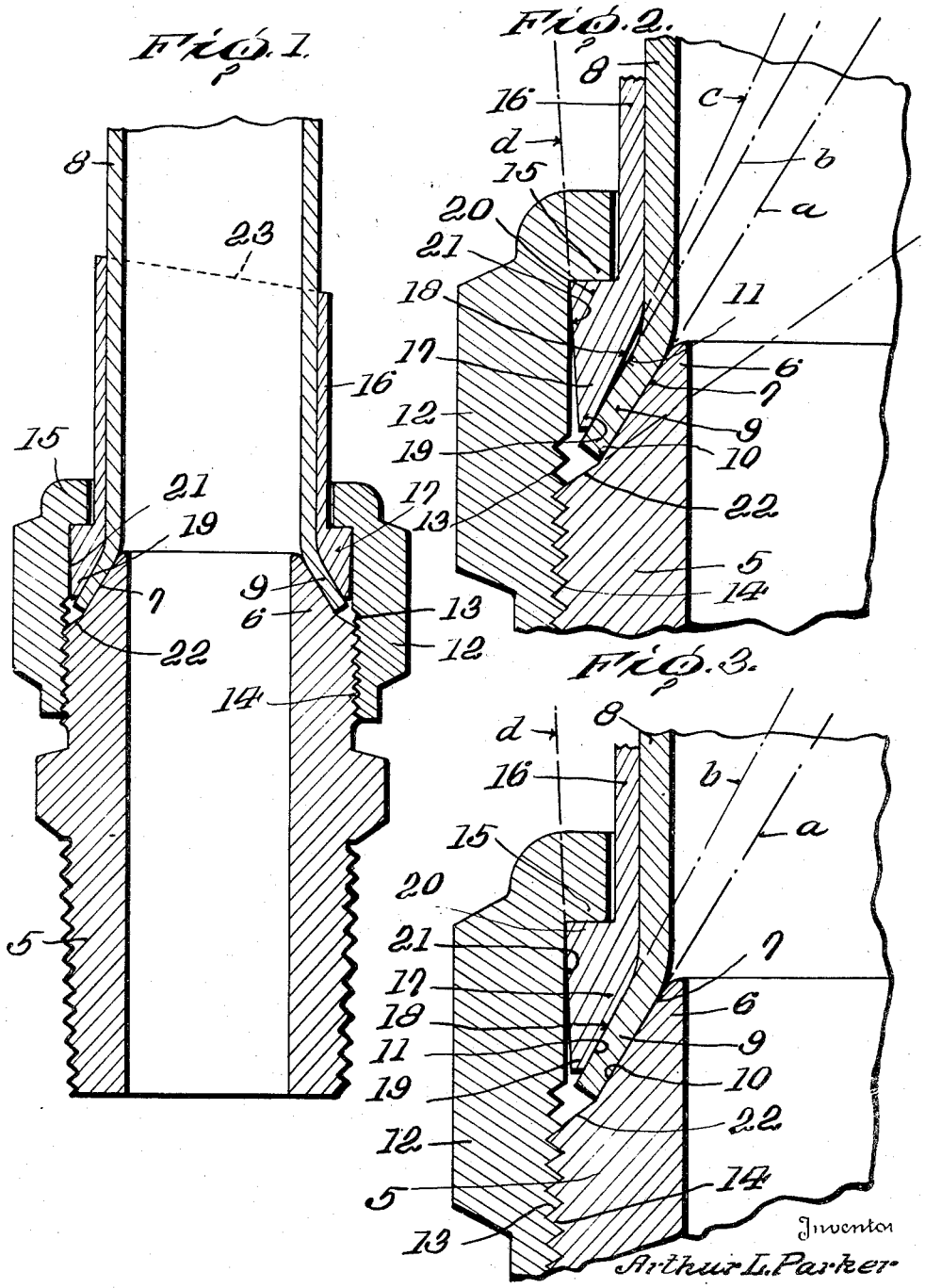

Patented Aug. 20, 1940

2,212,183

UNITED STATES PATENT OFFICE 2,212,183

TUBE COUPLING

Arthur L. Parker, Cleveland, Ohio

Application March 2, 1938, Serial No. 193,569
Renewed January 18, 1940

3 Claims. (Cl. 285—86)

The present invention relates to new and useful improvements in tube couplings, and more particularly to improvements in couplings for clamping the flared ends of metal tubes such as are typified in U. S. Letters Patents to Arthur L. Parker, 1,893,442 and 1,977,240 of January 3, 1933, and October 16, 1933, respectively.

An object of the invention is to provide a tube coupling wherein the coupling members are so constructed and dimensioned that the flared end of the tube is firmly contacted with throughout the greater portion of the flared end so as to provide a tight and efficient seal.

A further object of the invention is to provide a tube coupling of the above type wherein the outer clamping member engaging the flared end of the tube is so dimensioned and shaped that contact is first made at the free end of the clamping member whereby the clamping member is caused to expand, thus bringing the entire clamping surface into intimate contact with the outer surface of the flared end of the tube with a resulting tight and efficient seal.

A still further object of the invention is to provide a coupling of the above type wherein the clamping member engaging the outer surface of the flared end of the tube consists of an inner and an outer sleeve, and wherein the clamping end of the inner sleeve which contacts with the flared end of the tube is so shaped as to be free from radial contact with the outer sleeve when the coupling members are in firm gripping contact with said flared end of the tube.

With the above and other objects in view which will more fully appear, the nature of the invention will be more clearly understood by following the description, the appended claims, and the several views illustrated in the accompanying drawing.

In the drawing:

Figure 1 is a central longitudinal section illustrating the invention.

Figure 2 is an enlarged fragmentary section illustrating the initial engagement of the sleeve with the external flared end surface of the tube.

Figure 3 is a view similar to Figure 2 and illustrates the ultimate clamping contact of the sleeve and clamping member surfaces.

The improved coupling consists of a male member 5, having a projecting portion 6 provided with a tapered seat 7. The tube to be clamped is indicated at 8, and this tube is flared at its end, by a suitable flaring tool, as indicated at 9. Any suitable flaring tool may be used to give to the inner face 10 of the flared end of the tube an angular positioning, substantially the same as the angle of the seat 7 against which it is to be clamped. This flaring of the end of the tube thins the tube so that it decreases in thickness from the point of commencement to the extreme outer end of the flared portion. Thus the outer surface 11 of the flared end of the tube bears angular relation to the inner surface 10 as will be readily observed by reference to the dotted lines a, b forming continuations of said surfaces in Figures 2 and 3. In practice, the male member extension surface 7 and the flared end inner surface may be disposed at an angle of approximately thirty degrees with respect to the coupling axis, whereas the flared end outer surface is disposed at a more acute angle approximating twenty-eight degrees.

The coupling includes a female member formed in two sections. The outer section or clamp nut 12 is in the form of a sleeve having internal threads 13 adapted to engage the external threads 14 on the male member 5, and inwardly directed clamping shoulder 15. The female coupling member also includes an inner clamping sleeve 16 which has a telescoping connection with the outer sleeve 12, and the inner sleeve is provided with a head 17, the inner face of which is formed with a flared portion 18 adapted ultimately to have full surface contact with the outer surface 11 of the flared end 9 of the tube as shown in Figure 3 of the drawing. It will be observed by reference to the dotted line extension c in Figure 2 of the drawing that the flared surface 18 is formed so as to normally bear more acute angular relation to the coupling axis than does the flared tube end outer surface 11 which it is adapted to engage in clamping relation. Thus, during the assembling and clamp-setting of the coupling the extreme end or nose 19 of the inner sleeve head initially engages said outer surface 11. The head 17 includes a clamping shoulder 20 adapted to receive the longitudinal thrust imparted by the clamping shoulder 15 of the clamp nut or outer sleeve member 12, and the external wall of the nose is slightly tapered as at 21 so as to form a wedge-shaped clearance between said wall and the adjacent internal wall of the member 12. By reference to the dotted line extension d in Figures 2 and 3 of the drawing the angular position of the wall surface 21 will be clearly discernible.

At the base of the tapered surface 7 of the male extension 6 the surface flares abruptly as at 22 so as to form an abutment for the flared end 9 of the tube 8 without providing a positive limiting stop.

The outer end of the inner sleeve 16 terminates in an angularly disposed edge 23, that is, the sleeve terminus is not disposed in a line truly transverse or in right angular relation to the axis of the tube 8. By thus forming the tube end, bending strains or vibrations set up in the tube 8 are not localized at a single point, across the diameter, or in the length of said tube.

In Figure 2 of the drawing, partial assembly of the coupling is illustrated, and in Figures 1 and 3 complete assembly or the fully clamped condition of the parts is shown. It will be observed by reference to these figures that during the assembly of the coupling the nose 19 alone first contacts the outer surface 11 of the tube flare, and upon continued application of end thrust by the screwing on of the member 12 and engagement of the clamping shoulders 15 and 20, the head 17 will be spread or displaced radially outwardly to store gripping tension in said head and move forwardly along the flared end of the tube to cause the clamping surfaces 11, 18 and 7, 10 to tightly contact throughout the whole of their respective areas. During the displacement or outward spreading of the head 17 the wall 21 thereof will approach the adjacent wall of the sleeve member 12, but the degree of taper of said head wall is such that it will never contact and bind against said sleeve member wall. It is noted that the clamping shoulder on the head 17 is spaced a distance back from the inner flare surface of said head and the outer surface of the head and said inner wall of the coupling are so dimensioned that the head will contact with the nut in the region of the clamping shoulder, while the remaining portion of the head is free from contact with the coupling member, and therefore, the clamping force of the head against the tube is determined by the spring tension of the metal forming the head. In other words, the inner flare surface of the sleeve will yieldingly clamp the flared tube end while unlimited expansion of that portion of the head adjacent the clamping shoulder will be prevented.

With the coupling parts proportioned and arranged as herein described, remarkably better results in the way of efficient clamping are obtained than have been obtainable heretofore. Wider seating areas are provided, all danger of the inner sleeve head sticking in the outer sleeve or nut is avoided, and a measure of spring tension is stored in the sleeve head 17 by the spreading thereof which is found to be very effective in aiding retention of the desired clamped relation of the tube flare surfaces and the surfaces which they engage.

While I have illustrated the invention embodied in a tube coupling wherein the seat against which the flared end of the tube is clamped is in the form of a male member and the nut cooperating with the inner sleeve is in the form of a female member, it is obvious that these parts may be reversed and the clamping seat formed of a female member while the sleeve is forced against the tube end by a male member. It is also obvious that minor changes in the details of construction and the shaping of the parts may be made without departing from the spirit of the invention as set forth in the appended claims.

I claim:

1. In a coupling for tubes having the ends thereof flared, coupling members having threaded engagement with each other, one of said coupling members having a seat associated therewith adapted to engage the inner face of the flared end of the tube and the other coupling member having a clamping shoulder, a sleeve surrounding said tube and having a solid head provided with a shoulder against which the clamping shoulder of the coupling member engages, said head having the inner surface thereof provided with a coniform flare so shaped that the initial contact of the head with the flared end of the tube is at the free end of the head and adjacent the outer end of the flared end of the tube, whereby during the clamping action said head will be expanded and moved forward along the flared end of the tube into intimate contact with the outer surface thereof throughout substantially the entire extent of the flared surface on the sleeve head.

2. In a coupling for tubes having the ends thereof flared, coupling members having threaded engagement with each other, one of said coupling members having a seat associated therewith for engaging the inner flare of the flared end of the tube and the other coupling member having a clamping shoulder and an inner wall, a sleeve surrounding said tube and having a solid head capable of radial expansion during the clamping action, said head being provided with a clamping shoulder against which the shoulder of the coupling member engages and an inner flare surface for engaging the outer flared end of the tube, said clamping shoulder being spaced a distance back of the inner flare surface, the outer surface of said head and the said inner wall of the coupling member being so shaped relative to each other that when the sleeve head expands during the clamping action they will contact only in the region of the clamping shoulder, the remaining portion of the head being free from contact with the coupling member whereby the clamping force of the head against the tube is determined by the spring tension of the metal forming said head.

3. In a coupling for tubes having the ends thereof flared, coupling members having threaded engagement with each other, one of said coupling members having a seat associated therewith adapted to engage the inner face of the flared end of the tube and the other coupling member having a clamping shoulder, a sleeve surrounding said tube and having a solid head provided with a shoulder against which the clamping shoulder of the coupling member engages, said head having the inner surface thereof provided with a coniform flare so shaped that the initial contact of the head with the flared end of the tube is at the free end of the head and adjacent the outer end of the flared end of the tube, the outer surface of said head and said inner wall of the coupling member being so shaped relative to each other that when the sleeve head expands during the clamping action, the portion of said head contacting with the flared end of the tube is at all times out of contact with the coupling member whereby the clamping face of the head against the tube end is determined by the spring tension of the metal forming said head.

ARTHUR L. PARKER.